United States Patent [19]

Chikaraishi et al.

[11] Patent Number: 4,530,184
[45] Date of Patent: Jul. 23, 1985

[54] SLIDING TYPE DOOR ASSEMBLY

[75] Inventors: Takayo Chikaraishi, Kawasaki; Hiroshi Itoh, Tokyo, both of Japan

[73] Assignee: Nissan Motor Company, Limited, Kanagawa, Japan

[21] Appl. No.: 550,624

[22] Filed: Nov. 10, 1983

Related U.S. Application Data

[63] Continuation of Ser. No. 292,165, Aug. 12, 1981.

[30] Foreign Application Priority Data

Aug. 30, 1980 [JP] Japan ............................. 55-119010
Aug. 30, 1980 [JP] Japan ............................. 55-120219
Aug. 30, 1980 [JP] Japan ............................. 55-120221

[51] Int. Cl.³ .............................................. E05D 15/10
[52] U.S. Cl. ........................................ 49/213; 188/36
[58] Field of Search ............................ 49/213-215; 16/DIG. 20; 188/36, 74

[56] References Cited

U.S. PATENT DOCUMENTS 1,335,594  3/1920  Monson ..................... 188/36
1,894,668  1/1933  Clarke ..................... 16/DIG. 20
2,656,215  10/1953 Harvey .
2,990,566  7/1961  Lee .
4,152,872  5/1979  Tanizaki et al. ............. 49/214

FOREIGN PATENT DOCUMENTS 1953116   5/1967  Fed. Rep. of Germany .
48-40279  11/1973 Japan .
52-53072  12/1977 Japan .
52-53075  12/1977 Japan .
2049774   12/1980 United Kingdom .

OTHER PUBLICATIONS

50-33282 10001975 JPX

Primary Examiner—Kenneth Downey
Attorney, Agent, or Firm—Lowe, King, Price & Becker

[57] ABSTRACT

A sliding type door assembly for a vehicle, includes a guide rail fixed to the body of the vehicle, a door moving along the guide rail between its closed position and rear most open position, a guide follower attached to the door in such a manner that the guide follower can follow the door along the guide rail when the door moves, a brake mechanism for applying the braking power to the door by controlling the movement of the guide follower in relation to the guide rail, and a brake release means connected to the brake mechanism for releasing the brake mechanism.

8 Claims, 14 Drawing Figures

SLIDING TYPE DOOR ASSEMBLY

This is a continuation of application Ser. No. 292,165, filed Aug. 12, 1981.

BACKGROUND OF THE INVENTION

The present invention relates to a sliding type door assembly equipped with a brake mechanism.

Figure 1:
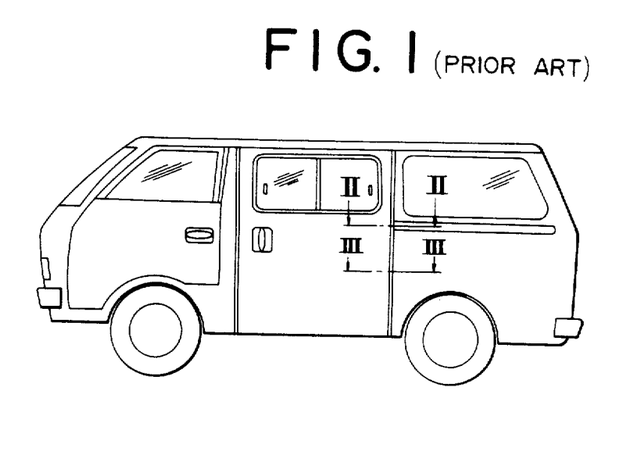
FIG. 1 is a schematic side view showing a conventional vehicle.
Figure 2:
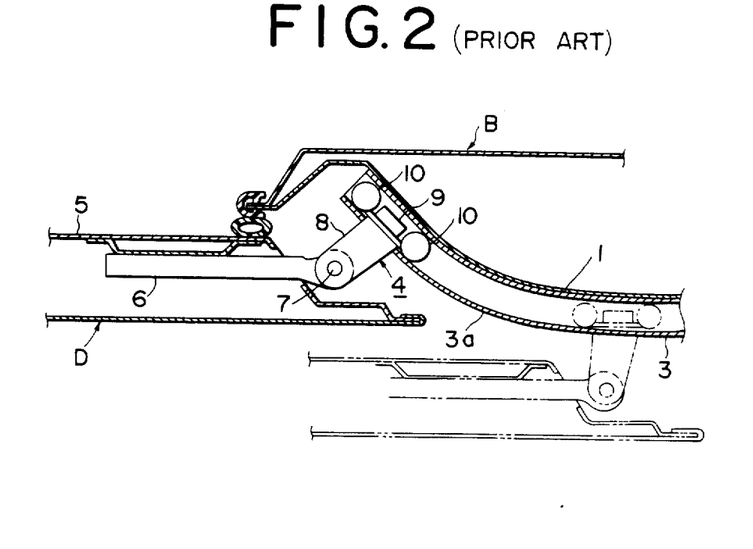
FIG. 2 is a sectional view taken along the line II—II in FIG. 1.
Figure 3:
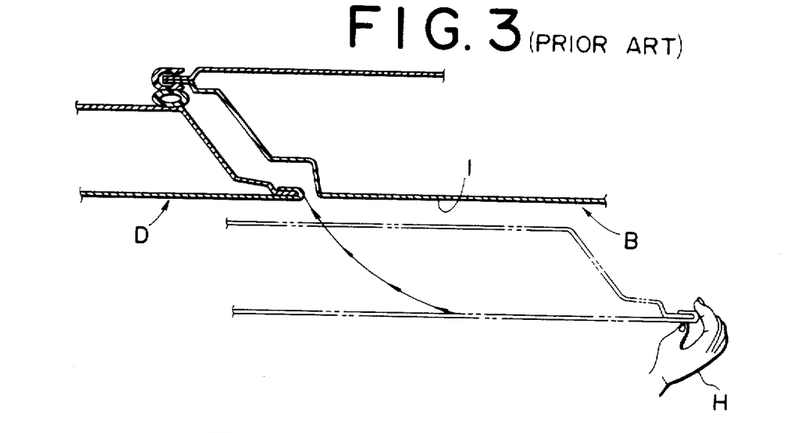
FIG. 3 is a sectional view taken along the line III—III in FIG. 1.

FIGS. 1 to 3 show a conventional sliding type door assembly. A vehicle body B includes a rear outer panel 1 on which a channel-shaped guide rail 3 is bolted. A sliding type door D is equipped with a guide follower 4 at a rear end thereof which slides in guide rail 3. Sliding type door D can thus move along the guide rail.

A front end portion 3a of guide rail 3 is curved toward the inside of vehicle body B so as to close sliding door D when it comes in a position as shown in FIG. 2.

Guide follower 4 includes a base bracket 6, a roller bracket 8, a sliding roller 9 and a pair of guide rollers 10. Base bracket 6 is affixed to the rear end of door inner panel 5 of sliding door D. Roller bracket 8 is rotatably connected through a shaft 7 to the base bracket. Sliding roller 9 is rotatably supported by roller bracket 8 so that it can move on the bottom of guide rail 3. Guide rollers 10 are rotatably supported by roller bracket 8 and can rotate on a side portion of guide rail 3.

In the aforesaid conventional door assembly, sliding door D is closed without receipt of any braking force or the like. Thus, if a hand H contacts the sliding door (as shown in FIG. 3) when it is closed, a finger may be accidentally pressed between the sliding door and vehicle body B.

OBJECT OF THE INVENTION

The object of the present invention is to provide a sliding type door assembly for a vehicle wherein a door can be braked so that one or more fingers can be prevented from being pressed between the vehicle body and the door.

DETAILED DESCRIPTION OF THE PREFERRED EMBODIMENT

Figure 4:
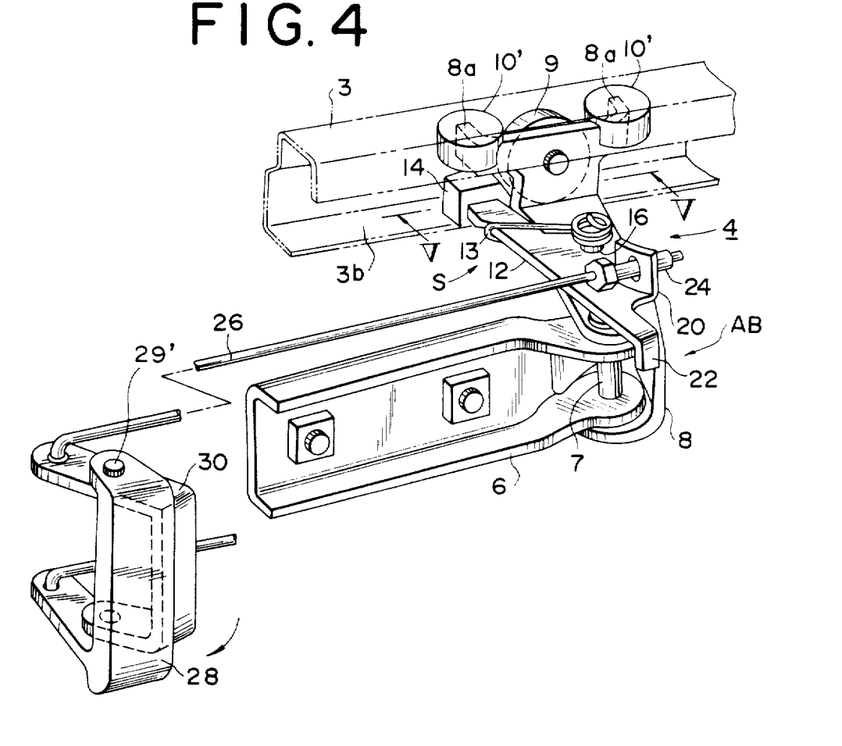
FIG. 4 is a perspective view showing a sliding type door assembly according to a preferred embodiment of the present invention.
Figure 5:
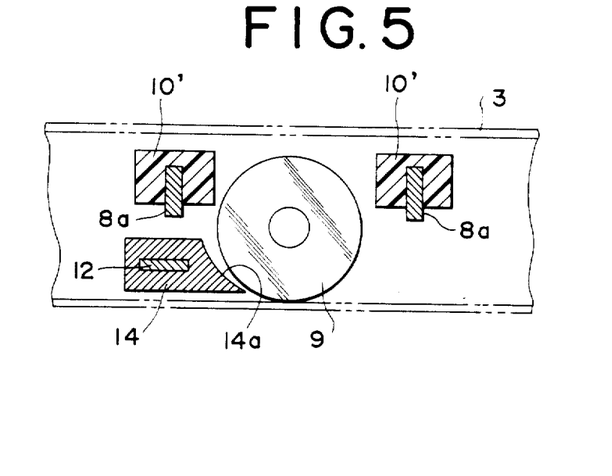
FIG. 5 is a sectional view taken along the line V—V in FIG. 4.
Figure 6:
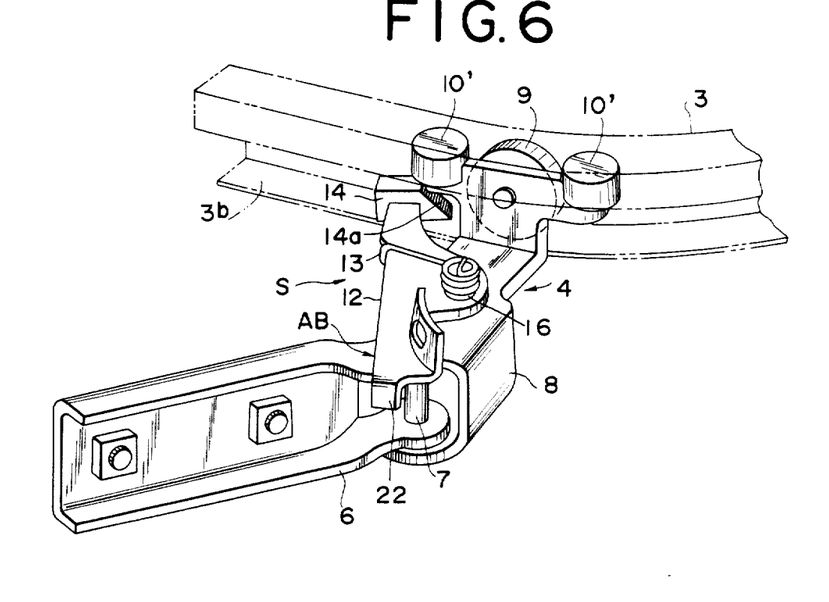
FIG. 6 is a perspective view showing a further embodiment of the present invention.

FIGS. 4 to 6 show a first embodiment of the present invention. A guide follower 4 is attached to sliding type door D at the rear side portion thereof. A lock device (not shown) is provided in such a manner that door D can move along guide rail 3 fixed to the vehicle body by means of bolts. The construction thereof is conventional.

Guide follower 4 includes a base bracket 6, a roller bracket 8, a sliding roller 9 and a pair of guide sliders 10'. Base bracket 6 is affixed at the rear end of the inner panel of sliding door D although not shown. Roller bracket 8 is rotatably connected to base bracket 6 through a shaft 7. Slide roller 9 is rotatably supported by roller bracket 8 for rolling engagement with the bottom surface of guide rail 3. Guide sliders 10' are in contact with a side surface of guide rail 3. Bent portions 8a of roller bracket 8 are inserted into each guide slider 10'.

A conventional guide roller can be used in place of the guide slider 10'.

The guide follower 4 is equipped with a braking mechanism S. Braking mechanism S includes a brake arm 12, a brake shoe 14, a spring 13, and brake release flanges 20, 22. Brake arm 12 is rotatably attached to roller bracket 8 with a shaft 16. Brake shoe 14 is fixed to the front end of brake arm 12 and has a braking surface 14a which is curved to make complete contact corresponding with peripheral surface of the slide roller 9 (see FIG. 5). Brake shoe 14 is biased by spring 13 to normally contact the peripheral surface of slide roller 9. Brake release flanges 20, 22 are formed by bending the other end of brake arm 12 upwardly and downwardly, respectively.

Upwardly bent brake release flange 20 is engaged through an adjusting nut 24 with one end of an actuating or connecting rod 26. The other end of rod 26 is connected to a brake release handle 30 which is rotatably provided on a shaft 29' together with a door operation handle 28. In operation, clockwise rotation of brake release handle 30 (as shown by the arrow in FIG. 4) causes the brake arm 12 to turn counterclockwise by way of the rod 26. Thus, brake shoe 14 disengages from slide roller 9 so that the braking is released.

The downwardly bent brake release flange 22 functions as follows: As shown in FIG. 6, when guide follower 4 enters the curved portion of guide rail 3, the roller bracket 8 rotates around the shaft 7 to some minor degree. In response thereto, brake arm 12 engages base bracket 6 so that brake arm 12 rotates to disengage brake shoe 14 from slide roller 9.

Guide follower 4 enters the curved portion of guide rail 3 just before door D is closed, or immediately after it is closed. At that time, the braking is released.

While guide follower 4 slidably moves on guide rail 3 at its straight portion, flange 22 does not engage any members.

In the aforesaid embodiment flange 22 and base bracket 6 constitute an automatic brake release mechanism AB.

In operation, when door D moves from a closed to an open position, handle 28 is actuated to rotate counterclockwise so that the door lock device (not shown) unlatches. At that time, the brake release flange 22 is in the condition shown in FIG. 6. Brake shoe 14 is disengaged from slide roller 9 so that no braking force is exerted. After the door lock device is unlatched, door D is pulled in a given direction. Thus, the door moves along the curved portion of guide rail 3 to enter the straight portion of the guide rail. As the guide follower enters the straight portion, the engagement of flange 22 with base bracket 6 is released so that brake shoe 14 moves toward slide roller 9. At the same time, slide roller 9 moves away from brake shoe 14. Accordingly, brake shoe 14 slightly contacts slide roller 9 so that only a minor friction force is exerted thereon.

If brake release handle 30 is actuated together with door handle 28 when door D is opened, then no friction force is exerted.

When door D moves from its open position to the closed position, the door is braked to stop. Even if one or more fingers contact the rear end of the door in order to close it, the door cannot be closed because the slide roller 9 moves up on the curved braking surface of the brake shoe 14 so as to produce a large braking force. Therefore, brake release handle 30 must be actuated to move brake shoe 14 away from slide roller 9 for door D to be closed.

At the curved portion of guide rail 3, as already stated, flange 22 engages base bracket 6 so that the braking is automatically released. Thus, the door D can be smoothly closed even if the brake release handle 30 does not operate.

The door D can be easily closed if the brake release handle 30 is continuously actuated until the curved portion of the guide rail 3 and thereafter released.

Figure 7:
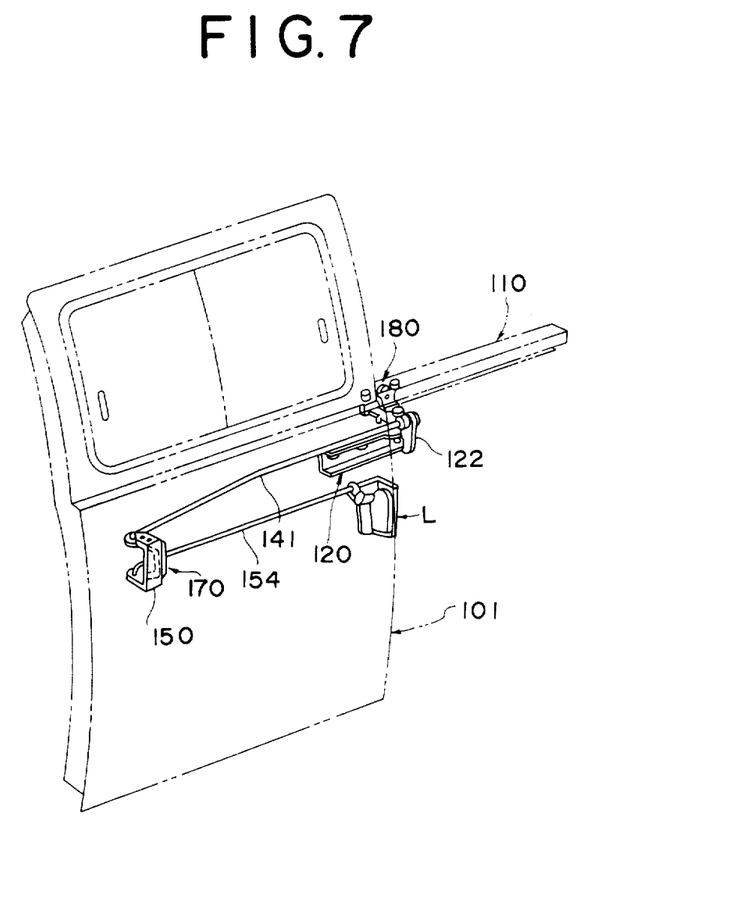
FIG. 7 is a perspective view showing a sliding type door assembly according to another embodiment of the present invention.
Figure 8:
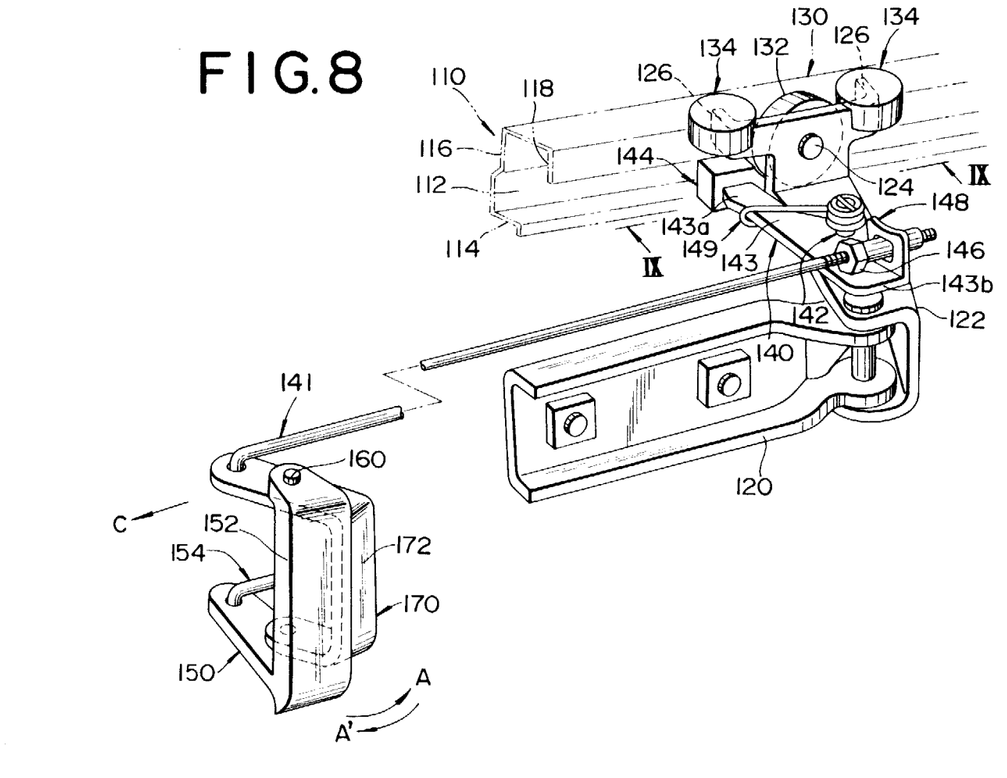
FIG. 8 is a perspective view showing an essential portion of the sliding door assembly as shown in FIG. 7.
Figure 9:
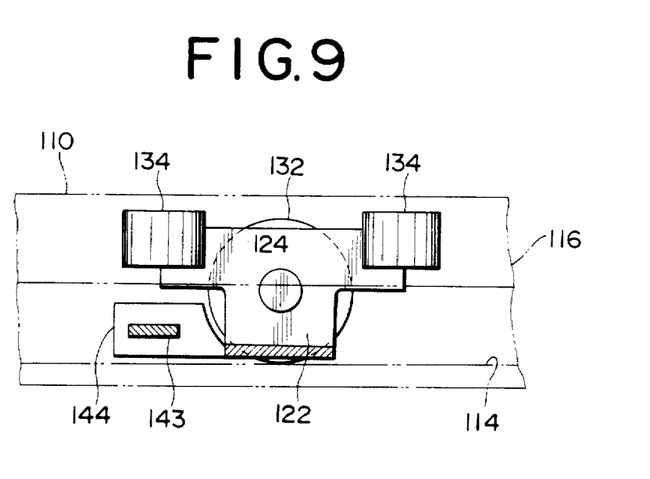
FIG. 9 is a sectional view taken along the line IX—IX in FIG. 8.

FIGS. 7 through 9 show a further embodiment of the present invention. A base bracket 120 and a roller bracket 122 supported rotatably thereby are provided at a rear portion of sliding door type door 101. A guide follower 130 is rotatably attached to roller bracket 122. The guide follower 130 moves along guide rail 110.

Guide follower 130 includes a slide roller 132 and a pair of guide sliders 134. Slide roller 132 moves on a channel 112 of guide rail 110 and particularly on a bottom portion 114 thereof. Guide sliders 134 engage side walls 116, 118 of guide rail 110. Slide roller 132 is supported through a shaft 124 on roller bracket 122. Guide sliders 134 are supported by a pair of projections 126 of roller bracket 122.

A brake device includes a braking mechanism 140 and a brake release handle 170. Braking mechanism 140 functions to normally brake the slide roller 132 so that door D is prevented from freely moving by means of its braking force. Brake release handle 170 is connected through a linkage or connecting rod 141 to braking mechanism 140 and supported rotatably by a shaft 160 which also rotatably supports a door operation handle 150. The brake release handle 170 has an operated portion 172 placed in parallel with and in cooperation with an operated portion 152 of the door operation handle 150.

The braking mechanism 140 includes a brake arm 143, a brake shoe 144, an operated portion 148 and a spring 149. Brake arm 143 is rotatably supported by roller bracket 122. Brake shoe 144 is fixed to one end 143a of arm 143 and normally engages the periphery of slide roller 132 to control rotation thereof. The operated portion 148 is formed as a flange at the other end 143b of arm 143 and engages the right end portion of linkage 41 with an adjustable nut 146. Spring 149 is wound around pin 142 to bias arm 143 so that brake shoe 144 engages slide roller 132.

In operation, to move door 1 from its closed position to its open position, door operation handle 150 and brake release handle 170 are manually actuated simultaneously in opposite directions A and A' (as shown in FIG. 8), respectively. As handle 150 turns, rod 154 moves in direction C so that a lock device (not shown) is unlatched. Thus, rotation of brake handle 170 causes the linkage or rod 141 to move in the direction opposite to direction C so that brake arm 143 can rotate in direction D against the biasing force of the spring 149. Brake shoe 144 moves away from slide roller 132 to release the braking action. During this operation, door 1 can be easily opened by moving the door in a given direction since no braking force is exerted on slide roller 132.

Even if the brake release handle 170 is not actuated, the door can be opened by actuating only door operation handle 150. As slide roller 132 moves away from brake shoe 144 when the door is opened, the braking force decreases to such an extent that the door can be opened.

In order to close the door in a normal manner, only brake release handle 170 can be rotated in direction A while door 1 is moved to close without receipt of any braking force.

The brake device prevents the door from closing. That is, as brake shoe 144 normally contacts the slide roller 132 under the biasing force of spring 149, slide roller 132 moves up on the curved portion of brake shoe 144 so that a large braking force is exerted on slide roller 132 as in the first embodiment.

The door can be stopped at any desired intermediate position between the closed and opened positions of the door. During closing or opening operation of the door, brake release handle 170 can be released to rotate to its original position so that brake shoe 144 suddenly engages slide roller 132, stopping the door.

Figure 10:
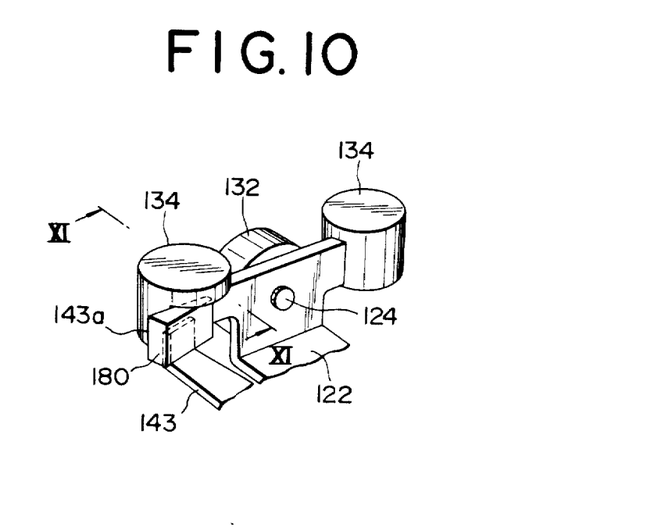
FIG. 10 is a perspective view showing a braking mechanism according to another embodiment of the present invention.
Figure 11:
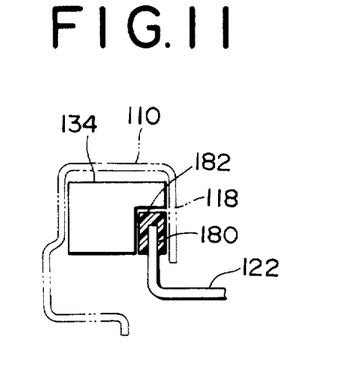
FIG. 11 is a sectional view taken along the line XI—XI in FIG. 10.

FIGS. 10 and 11 show another embodiment of the present invention which is a modification of the embodiment shown in FIGS. 7 through 9. Like or corresponding parts or members are designated by the same reference numerals, and only modified portions thereof will be described.

A wedge member 180 is attached to one end 143a of brake arm 143 between one of guide sliders 134 and side wall 118 of the guide rail so that sliding of the guide slider can be controlled. Wedge member 180 engages a flat recessed portion 182 of guide slider 134.

In this embodiment, braking shoe 144 is omitted. Guide slider 134 provides the necessary braking action instead of slide roller 132.

Figure 12:
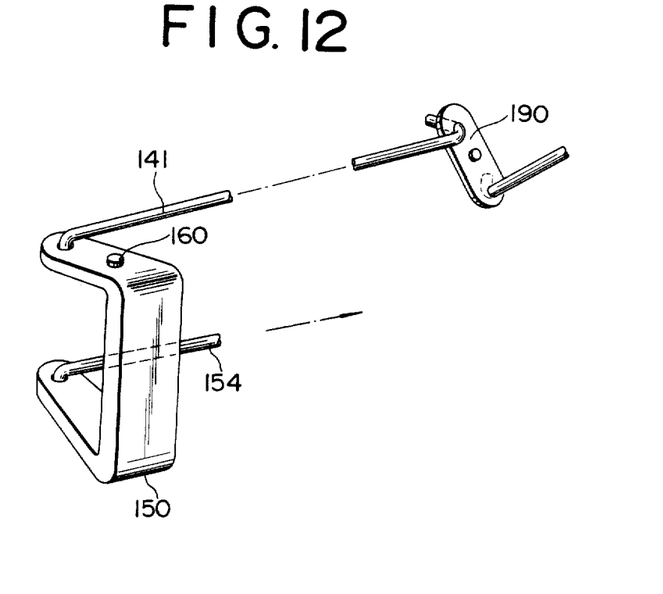
FIG. 12 is a perspective view showing a connecting means according to the present invention.

FIG. 12 shows another embodiment of the present invention which is another modification of the embodiment shown in FIGS. 7 to 9. A single handle 150 is used commonly for both purposes of door operation and brake release. Handle 150 is connected not only through a linkage 154 to the lock device but also through linkage 141 and a conversion plate 190 to brake mechanism 140.

In operation, whenever the door is opened, the braking force is released. Whenever the door is closed, also, braking is released.

Figure 13:
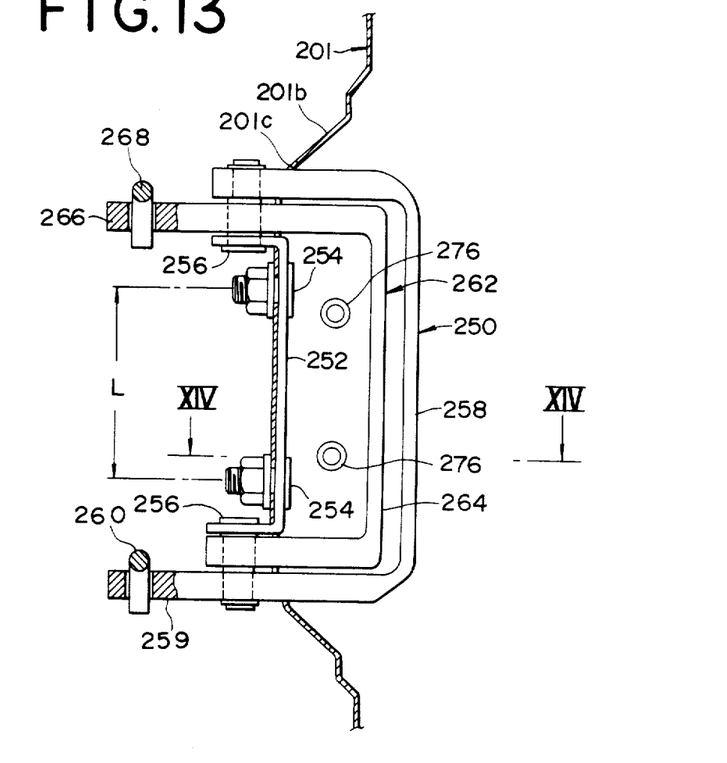
FIG. 13 shows a pair of handles according to another embodiment of the present invention.
Figure 14:
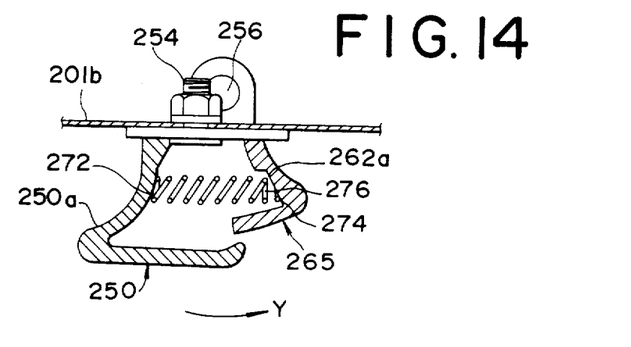
FIG. 14 is a sectional view taken along the line XIV—XIV in FIG. 14.

FIGS. 13 and 14 show another embodiment of the present invention. A handle 250 for operating a door is attached to a base plate 252 in such a manner that it can rotate about a pair of shafts 256. A hole 201C is formed in outer panel 201b of door 201. Base plate 252 is fixed at the periphery of hole 201C by means of bolts 254. An operation portion 258 and an actuating portion 259 of handle 250 are positioned at the opposite sides. Actuating portion 259 is connected to the door lock device by way of a remote control rod 260.

A brake release handle 262 is rotatably secured of the handle by shafts 256. An actuating portion 266 of handle 262 in opposition to an operation portion 264 thereof is connected to an end of a remote control rod 268. The other end of remote control rod 268 is connected to a driven portion of a brake arm as shown in FIGS. 4 and 8.

A return spring 276 is disposed between a seat 272 formed at inner portion 250a of door operation handle 250 and a seat 276 formed at the inner portion 262a of the brake release handle 262. Thus, both handles 262, 250 can return to their original positions by means of the biasing force of return spring 276.

In operation, when the door is opened, door operation handle 250 is rotated against the biasing force of return spring 276 in the direction of arrow Y (FIG. 14). At the same time, brake release handle 262 is rotated in the direction opposite arrow Y. The door lock device is unlatched to disengage from a striker (not shown) while brake arm 12 or 143 is actuated against the biasing force of spring 13 or 149 to release the braking mechanism. As the brake mechanism is released, the door can be smoothly opened.

It should be noted that the door can be smoothly opened even if only the door operation handle 150 is operated as above-stated.

The pitch L between bolts 254 for fastening base plate 252 can be set large because spring 272 is provided between both handles. For this reason, base plate 252 can be rigidly fixed. Also, the attachment hole or holes of the door panel can be small so that the cooling efficiency within the vehicle can increase. As the number of springs between both handles can be increased, the door can be surely prevented from accidentally opening. In case a coil spring is used, the handles can be easily assembled to facilitate automatic assembling.

What is claimed is:

1. A sliding door assembly for a vehicle, comprising:
    a guide rail fixed to the vehicle;
    a door movable along the guide rail between its closed position and an open position;
    a guide follower attached to the door so that the guide follower can follow the door along the guide rail to open or close the door;
    a brake mechanism for applying braking power to the door by controlling movement of the guide follower in relation to the door; and
    a brake manual-release mechanism connected to the brake mechanism for manually releasing the brake mechanism;
    the guide follower including a base bracket affixed to the door, a roller bracket supporting the brake mechanism and hinged to the base bracket, a sliding roller rotatably attached at one end portion of the roller bracket for rolling movement on the guide rail so as to support the door in a vertical direction, and a guide member for controlling movement of the door in a lateral direction.

2. A sliding door assembly as claimed in claim 1, further comprising:
    means for automatically releasing the brake mechanism just before the door is completely closed.

3. A sliding door assembly as claimed in claim 2, wherein the automatically releasing means includes a base bracket affixed to the door to pivotally support the roller bracket and an engaging means which is operable to contact the base bracket to thereby release the brake mechanism as the guide follower comes to a curved portion of the guide rail just prior to complete closing of the door.

4. A sliding door assembly as claimed in claim 3, wherein the engaging means is a projection projecting from one end of a brake arm of said brake mechanism.

5. A sliding door assembly as claimed in claim 4, wherein the brake mechanism includes said brake arm pivotally attached to the roller bracket and a brake member affixed at an end portion of the brake arm to prevent the sliding roller from rolling on the guide rail by contacting said sliding roller.

6. A sliding door assembly as claimed in claim 5, wherein the brake member of the brake mechanism is placed at said one end portion of the roller bracket.

7. A sliding door assembly as claimed in claim 5, wherein the brake member is a brake shoe engageable or disengageable with the sliding roller.

8. A sliding door assembly as claimed in claim 5, wherein the brake member is a wedge member insertable between the guide member and the guide rail.

* * * * *